United States Patent
Hamamoto et al.

(10) Patent No.: US 6,998,612 B2
(45) Date of Patent: Feb. 14, 2006

(54) SENSOR HAVING MEMBRANE

(75) Inventors: Kazuaki Hamamoto, Nagoya (JP); Inao Toyoda, Anjo (JP)

(73) Assignee: Denso Corporation, Kariya (JP)

( * ) Notice: Subject to any disclaimer, the term of this patent is extended or adjusted under 35 U.S.C. 154(b) by 195 days.

(21) Appl. No.: 10/653,067

(22) Filed: Sep. 3, 2003

(65) Prior Publication Data

US 2004/0079885 A1   Apr. 29, 2004

(30) Foreign Application Priority Data

Oct. 25, 2002 (JP) .............................. 2002-310978
Jul. 16, 2003 (JP) .............................. 2003-275312

(51) Int. Cl.
*G01J 5/00* (2006.01)

(52) U.S. Cl. .................................. 250/338.1

(58) Field of Classification Search ............ 250/338.1, 250/330, 338.2, 338.4, 339.01, 370.06
See application file for complete search history.

(56) References Cited

U.S. PATENT DOCUMENTS

| | | | | |
|---|---|---|---|---|
| 5,589,689 A | * | 12/1996 | Koskinen | 250/339.01 |
| 6,305,840 B1 | * | 10/2001 | Kim et al. | 374/133 |
| 6,388,255 B1 | * | 5/2002 | Di Maio et al. | 250/338.2 |
| 6,720,559 B2 | * | 4/2004 | Kubo | 250/338.1 |
| 6,793,389 B2 | * | 9/2004 | Chavan et al. | 374/179 |
| 2003/0111605 A1 | * | 6/2003 | Sato et al. | 250/338.4 |

FOREIGN PATENT DOCUMENTS

| JP | A-4-98883 | | 3/1992 |
|---|---|---|---|
| JP | 07198474 A | * | 8/1995 |

* cited by examiner

*Primary Examiner*—David Porta
*Assistant Examiner*—Faye Polyzos
(74) *Attorney, Agent, or Firm*—Posz Law Group, PLC

(57) ABSTRACT

A sensor includes a detector for detecting physical quantity, a membrane, and a stress relaxation area. A stress is expected to concentrate in the stress relaxation area in a case of manufacturing process of the sensor or a case of operating the sensor. The detector is disposed on the membrane except for the stress relaxation area.

10 Claims, 8 Drawing Sheets

SENSOR HAVING MEMBRANE

CROSS REFERENCE TO RELATED APPLICATION

This application is based on Japanese Patent Applications No. 2002-310978 filed on Oct. 25, 2002, and No. 2003-275312 filed on Jul. 16, 2003, the disclosures of which are incorporated herein by reference.

FIELD OF THE INVENTION

The present invention relates to a sensor having a membrane.

BACKGROUND OF THE INVENTION

A sensor 100 having a membrane structure according to a prior art is shown in FIGS. 8A and 8B. The sensor 100 is a thermopile type infrared sensor, and disclosed in Japanese Unexamined Patent Application Publication No. H04-98883. The sensor 100 has a thin film membrane 112. A hot contact point 115a of a thermocouple 115 (i.e., a hot junction 115a of a thermocouple 115) is disposed on the membrane 112 so that thermal separation between the hot contact point 115a and a cold contact point 115b of the thermocouple 115 (i.e., a cold junction 115b of the thermocouple 115) is improved.

In the above sensor 100, an upper surface of the sensor 100 disposed on the thermopile 115 is uneven, i.e., the upper surface has a wavy structure, as shown in FIG. 7. On the other hand, the other surface of the sensor 100 (not shown), where the thermopile 115 is not formed, is even, i.e., flat. By means of the wavy structure, stress is concentrated in this uneven portion.

When comparatively large stress is applied to the sensor 100 by means of thermal stress or distortion of the sensor 100 in a case of manufacturing process or a case of operating the sensor, the membrane 112 easily cracks because the mechanical strength of the membrane 112 is comparatively weak. Further, the membrane 112 may be broken by the large stress.

It is considered that thickness of a film for providing the membrane 112 becomes thicker so as to protect the sensor from cracking or being broken. However, in accordance with becoming thicker, thermo-conductivity of the film becomes large, so that thermal separation between the hot contact point 115a and the cold contact point 115b is deteriorated. Therefore, a sensitivity of the sensor is decreased. Further, it is considered that material of the film is changed to new material, which has comparatively low thermo-conductivity, so as to compensate the deterioration of the thermal separation. However, this makes the manufacturing cost increase.

SUMMARY OF THE INVENTION

In view of the above problem, it is an object of the present invention to provide a sensor having a membrane, stress on which is reduced so that the sensor is limited to crack and to be broken.

A sensor includes a detector for detecting physical quantity, a membrane, and a stress relaxation area. A stress is expected to concentrate in the stress relaxation area in a case of manufacturing process of the sensor or a case of operating the sensor. The detector is disposed on the membrane except for the stress relaxation area.

Since the above sensor has the stress relaxation area, in which the stress is concentrated, the sensor is limited to crack and to be broken. Moreover, the stress relaxation area is easily formed without adding a new part or adding a new manufacturing process, since the stress relaxation area can be formed by only changing a pattern of the detector. Therefore, the manufacturing process of the sensor is not changed substantially so that the manufacturing cost of the sensor is almost the same as that of a sensor without the stress relaxation area.

Preferably, the membrane has a rectangular shape. More preferably, the rectangular shape of the membrane has a width and a length, and the stress relaxation area has a rectangular shape having a width and a length. The width of the stress relaxation area is one-two hundredth of the width of the membrane, and the length of the stress relaxation area is one-fifteenth of the length of the membrane. The stress relaxation area is disposed in a middle of an edge of the rectangular shape, and disposed inside from the edge of the rectangular shape.

Preferably, the thermopile includes a plurality of thermocouples with a pair of a hot contact portion and a cold contact portion, and the hot contact portion is disposed on the membrane, and the cold contact portion is disposed outside of the membrane.

Preferably, the stress relaxation area is disposed in a range between 0 $\mu$m and 5 $\mu$m measured from an edge of the membrane.

Preferably, the membrane is composed of a thin film disposed on a semiconductor substrate, and the thermopile is disposed on the thin film. More preferably, the semiconductor substrate has a rectangular opening disposed opposite to the thin film so that the membrane has a rectangular shape. The hot contact portion is disposed on the thin film of the membrane so that the hot contact portion is disposed on the rectangular opening of the semiconductor substrate, and the cold contact portion is disposed on the thin film on the semiconductor substrate.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1A:
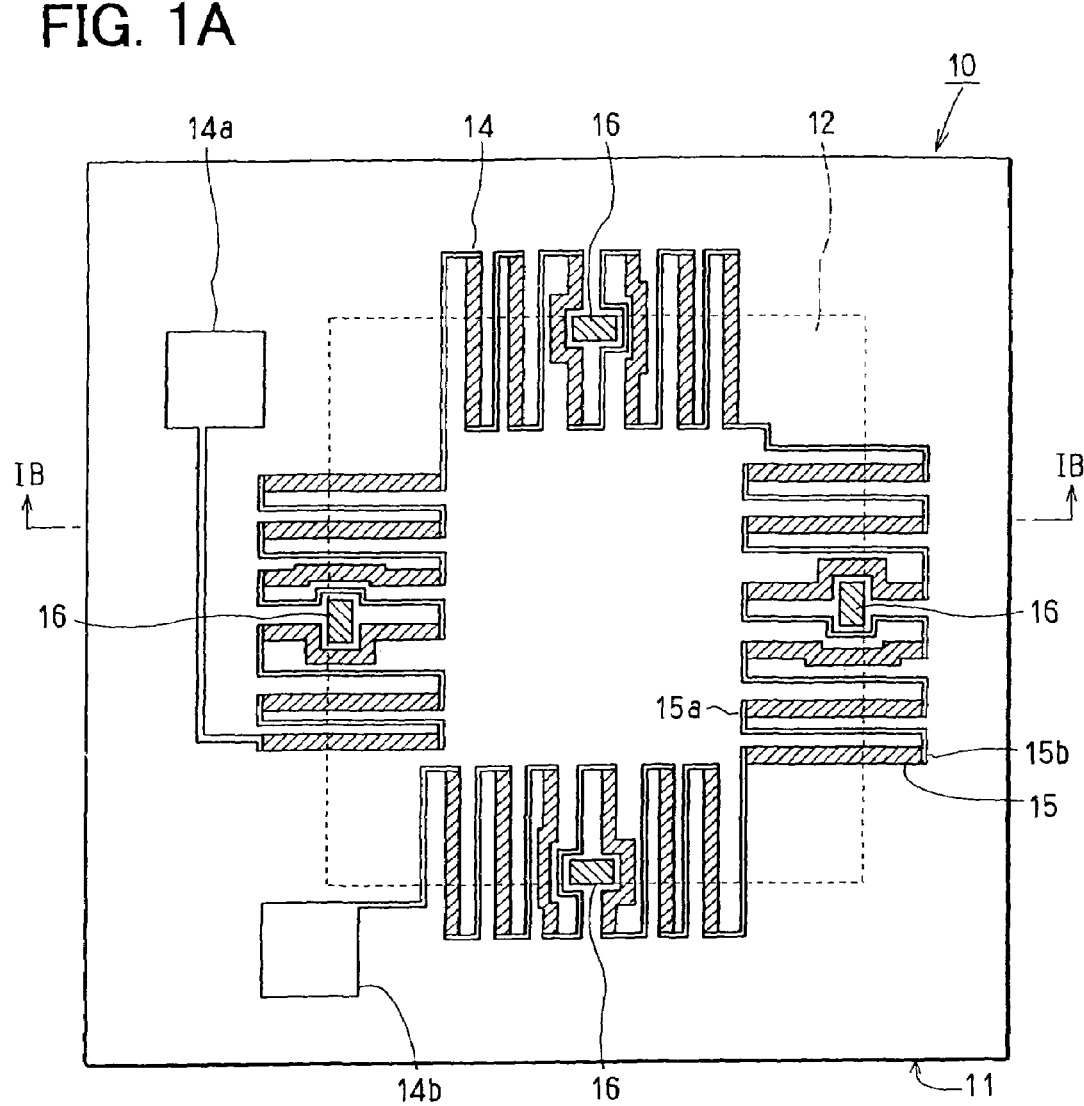
FIG. 1A is a schematic plan view showing a sensor according to a preferred embodiment of the present invention.
Figure 1B:
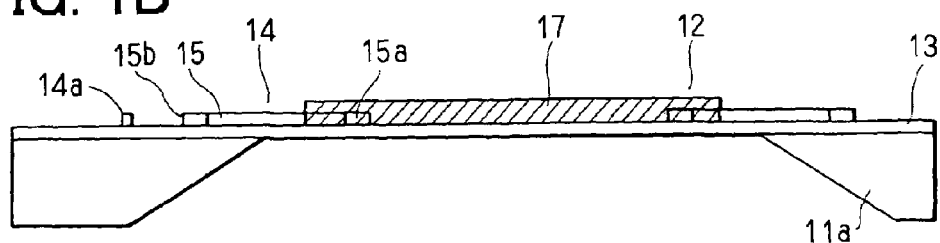
FIG. 1B is a cross-sectional view taken along line IB—IB in FIG. 1A.

A sensor 10 according to a preferred embodiment of the present invention is shown in FIGS. 1A and 1B. The sensor 10 is composed of a sensor chip 11 for sensing infrared light. The sensor chip 11 is formed with fabricating a silicon substrate 11a. On an upper surface of the sensor chip 11, a thin film 13 is formed for providing a membrane 12. The membrane 12 is formed in such a manner that a lower surface of the silicon substrate 11a is etched so as to expose the thin film 13. On the lower side of the silicon substrate 11a, the thin film 13 is exposed to have a rectangular shape. Therefore, the membrane 12 has the rectangular shape in a plan view.

On the thin film 13, a thermopile 14 is formed. The thermopile 14 is provided by a plurality of thermocouples 15 connected with series connection. Each thermocouple 15 has a hot contact point 15a and a cold contact point 15b. The hot contact point 15a is disposed on the membrane 12, and the cold contact point 15b is disposed on the silicon substrate 11a. The predetermined number of thermocouples 15 is disposed in a middle portion of each edge of the rectangular shape of the membrane 12.

Here, at the middle of the edge of the rectangular shape of the membrane 12, a stress relaxation area 16 is disposed. In the stress relaxation area 16, the thermopile 14 is not formed. Stress is mainly concentrated and applied to the membrane 12 in this stress relaxation area 16 because of a construction of the membrane 12. In other words, if the thermopile 14 is formed on the membrane 12 in this stress relaxation area 16, a step structure is formed by the thermopile 14. The membrane 12 becomes weaker by this step structure, so that the membrane 12 with the thermopile 14 may crack easily.

Figure 6:
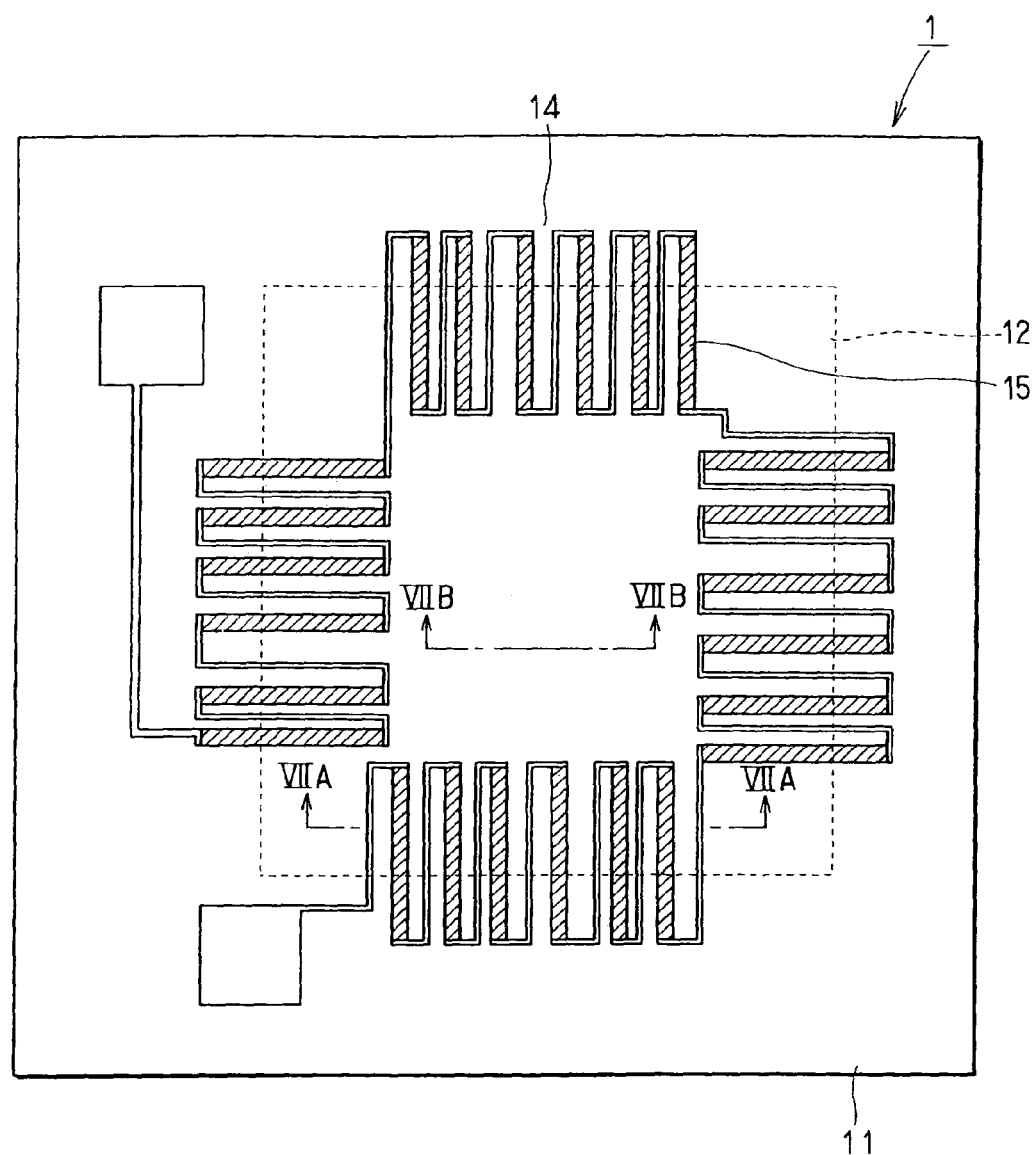
FIG. 6 is a schematic plan view showing a sensor according to a comparison of the preferred embodiment.
Figure 7A:
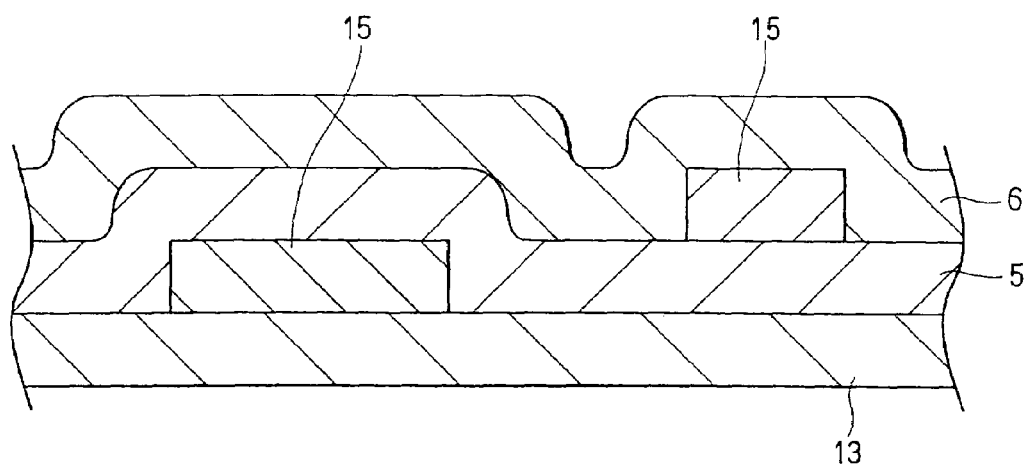
FIG. 7A is a cross-sectional view taken along line VIIA—VIIA in FIG. 6.
Figure 7B:
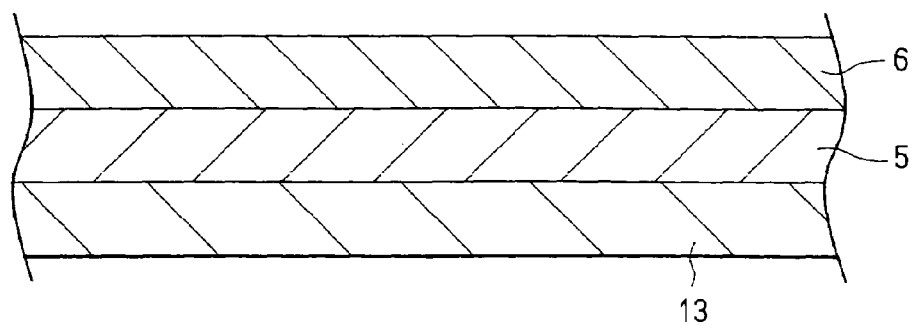
FIG. 7B is a cross-sectional view taken along line VIIB—VIIB in FIG. 6.
Figure 8A:
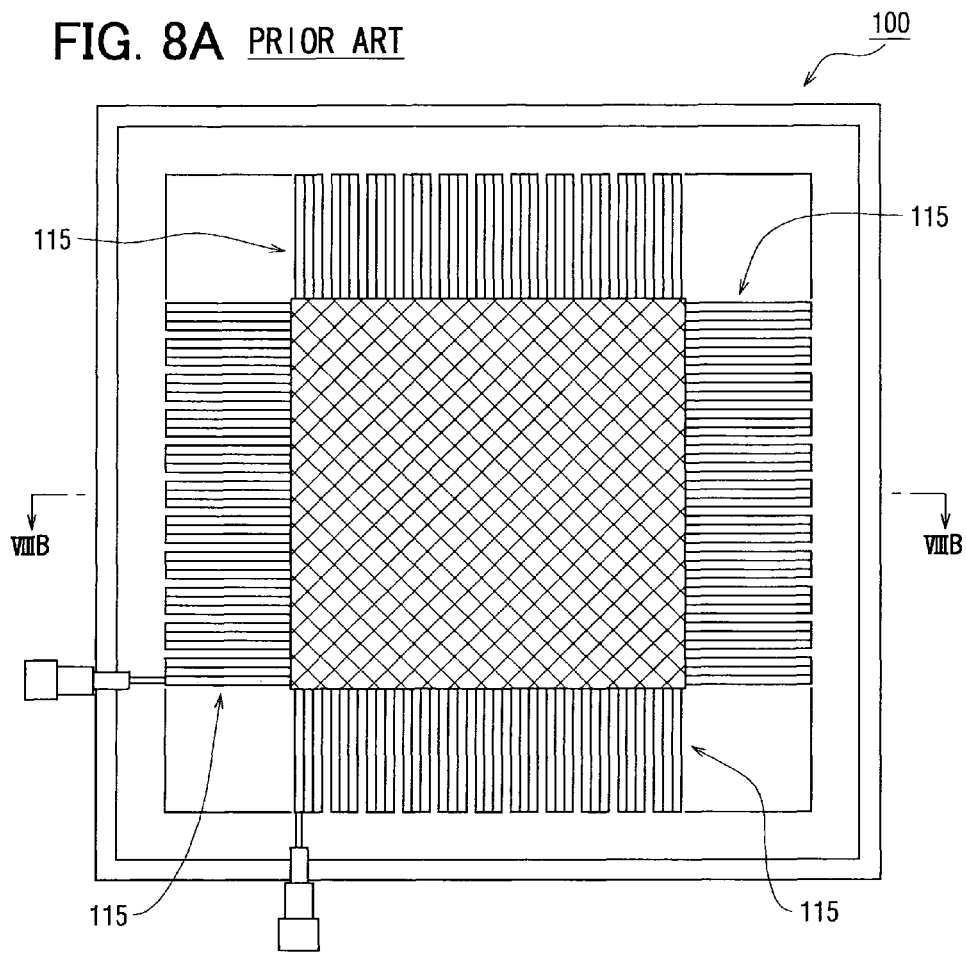
FIG. 8A is a plan view showing a sensor according to a prior art.
Figure 8B:
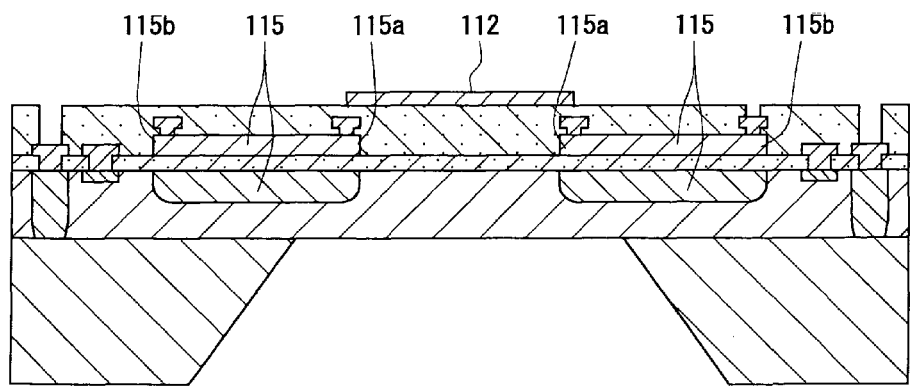
FIG. 8B is a cross-sectional view taken along line VIIIB—VIIIB in FIG. 8A.
Figure 9:
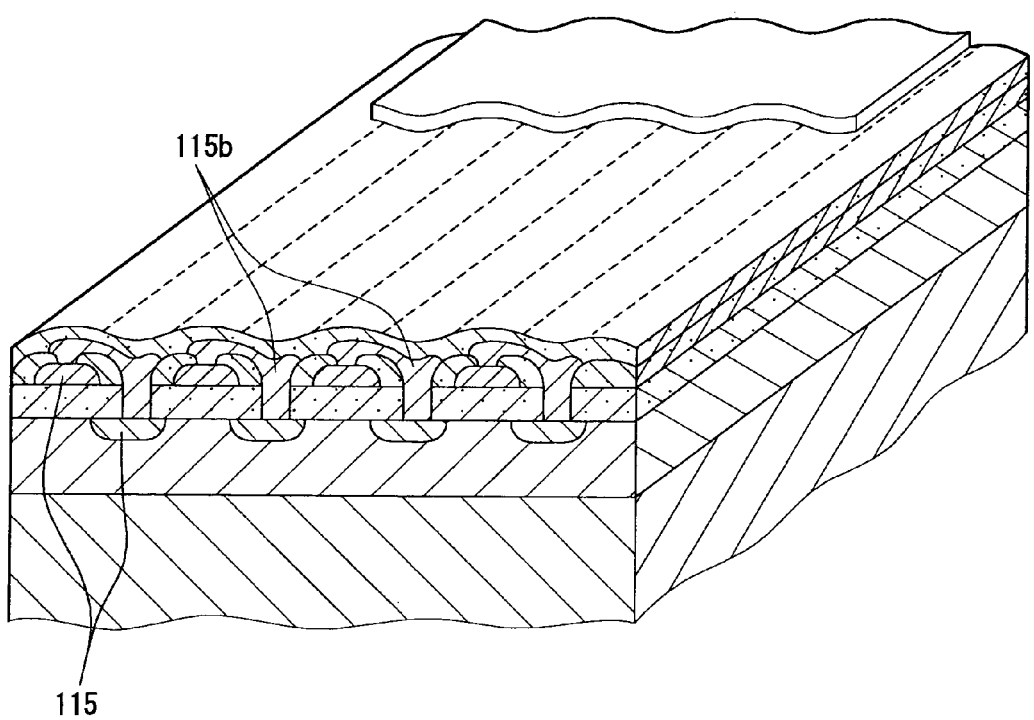
FIG. 9 is a partially enlarged cross-sectional perspective view showing the sensor according to the prior art.

To compare with the sensor shown in FIG. 1, a comparison sensor 1 is prepared, as shown in FIG. 6. The comparison sensor 1 has no stress relaxation area 16 in the middle of the edge of the membrane 12. As shown in FIG. 7A, the thermopile 14 is insulated by an insulation film 5. On the insulation film 5, a passivation film 6 is formed. Therefore, a step is formed on the thermopile 15. On the other hand, in a portion, which has no thermopile 15, there is no step, as shown in FIG. 7B. The stress is concentrated at the step, and the step makes the membrane 12 weaker.

The inventors have confirmed by the experiment that the strength of the membrane 12 with the thermopile 14 is weaker than 70% of the strength of the membrane 12 without the thermopile 14. Moreover, as described later, the stress is easily concentrated in the middle of the edge of the membrane 12, i.e., the stress relaxation area 16. Therefore, the thermopile 14 is not formed on the membrane 12 in the stress relaxation area 16.

Next, an infrared absorption film 17 is formed on the thermopile 14 on the membrane 12. The infrared absorption film 17 is limited to reflect and to transmit the received infrared light substantially, so that the thermal absorption of the infrared absorption film 17 is promoted. Two output terminals 14a, 14b are disposed at both ends of the thermopile 14, respectively. The output terminals 14a, 14b as a bonding pad electrically connect to an outer circuit outside the sensor 10. Each output terminal 14a, 14b has a predetermined area for connecting a bonding wire or a bump.

Figure 2:
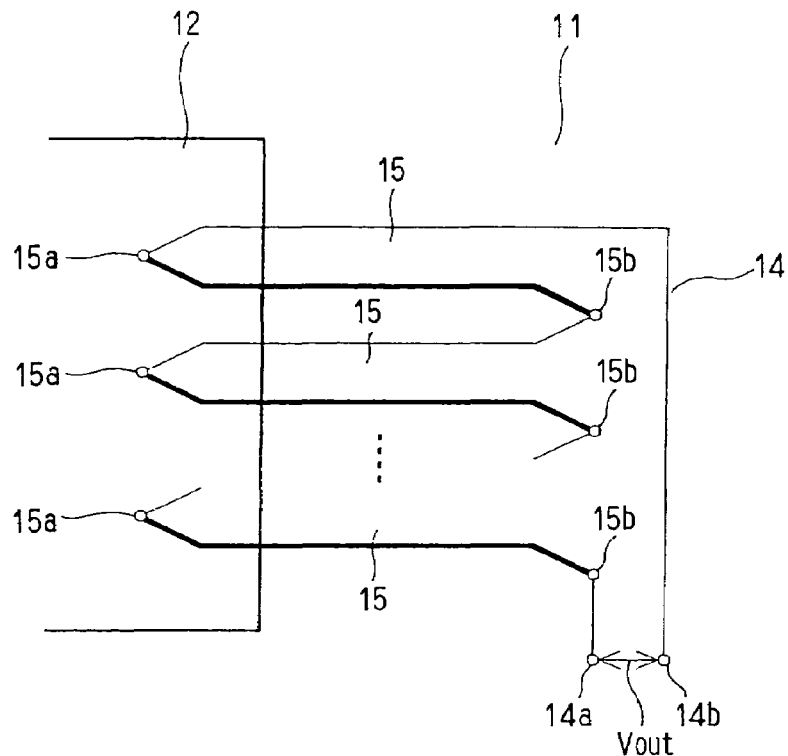
FIG. 2 is a partial circuit diagram showing an equivalent circuit of a thermopile of the sensor according to the preferred embodiment.

The thermopile 14 has an equivalent circuit shown in FIG. 2. The thermopile 14 includes a plurality of thermocouples 15. Each thermocouple 15 is composed of a pair of electrodes. Each electrode is made of material, which is different from each other. In FIG. 2, a pair of narrow and broad lines shows a pair of electrodes. A plurality of thermocouples 15 connects with a series connection. All of the hot contact points 15a are disposed on the membrane 12, and all of the cold contact points are disposed on the silicon substrate 11a.

When the sensor 10 catches an infrared light, the infrared light is absorbed in the infrared absorption film 17. Then, the hot contact point 15a is heated, so that temperature of the hot contact point 15a becomes high. That is, because the hot contact point 15a has no thermal diffusion portion substantially for conducting heat to the outside. On the other hand, the cold contact point 15b is limited to heat, since the silicon substrate 11a works as a heat sink for conducting heat to the outside. Therefore, temperature of the hot contact point 15a is different from that of the cold contact point 15b. This temperature difference causes difference of electromotive force (i.e., the potential difference) between the hot contact point and the cold contact point according to the Seebeck effect. Thus, each thermocouple 15 has each potential difference, respectively. And, all of the potential differences are summed up so that an output voltage VOUT is provided, because the thermocouples are connected with series connection. The output voltage VOUT is outputted from a pair of output terminals 14a, 14b.

Figure 3:
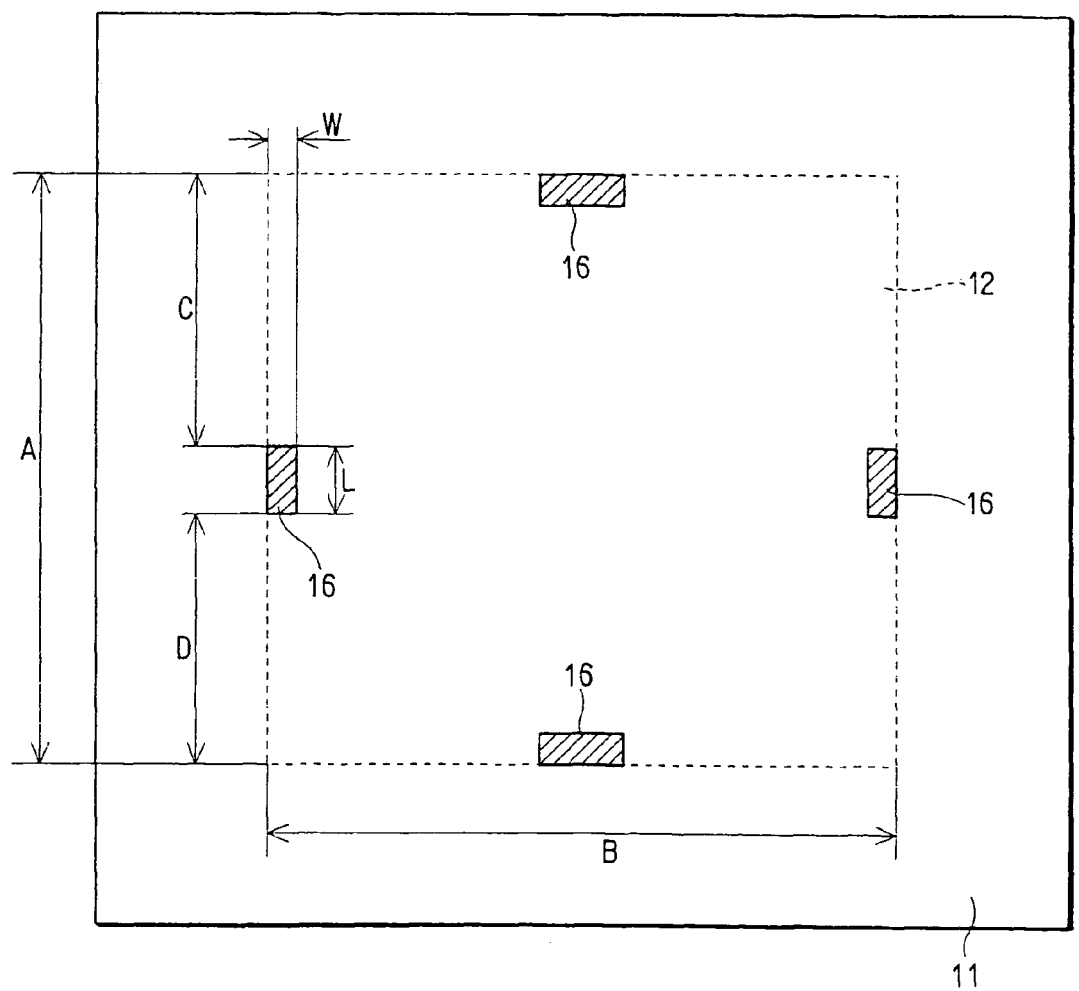
FIG. 3 is a plan view of a sensor chip of the sensor explaining a position of a stress relaxation area, according to the preferred embodiment.

The stress relaxation area 16 is defined as follows. As shown in FIG. 3, the stress relaxation area 16 has a rectangular shape, which has a length L and a width W. Assuming each length of edges of the membrane 12 is A and B, respectively, the length L and the width W are provided as follows.

$$L = A/15 \quad (1)$$

$$W = B/200 \quad (2)$$

The stress relaxation area 16 is disposed at the middle of the edge of the membrane 12. In other words, an upper residual length C of the edge is equal to a lower residual length D of the edge.

The stress is concentrated in this area, i.e., the stress relaxation area 16, as described below.

Figure 4A:
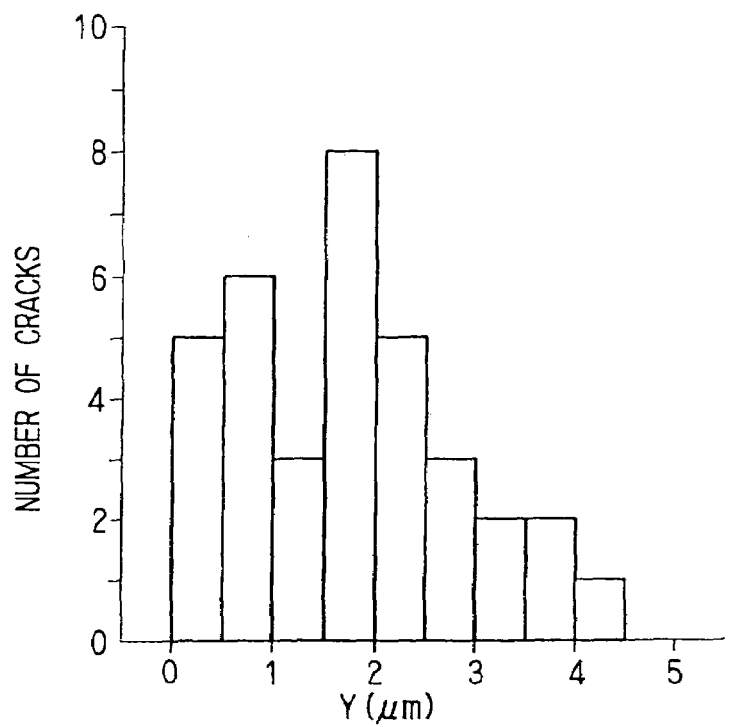
FIG. 4A is a histogram showing a relationship between the number of cracks and a distance Y.
Figure 4B:
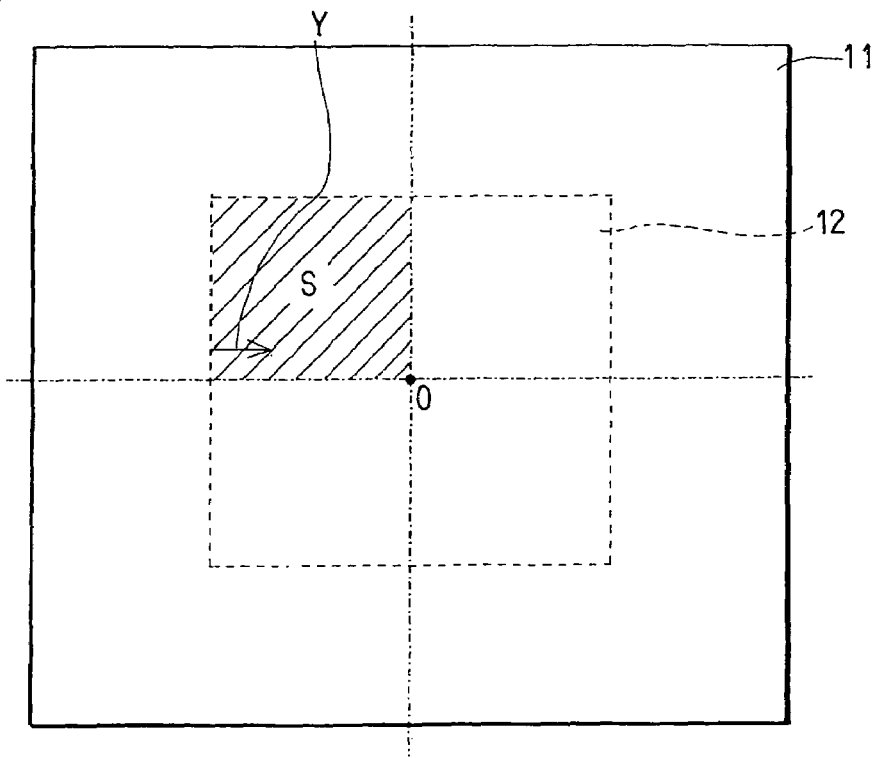
FIG. 4B is a schematic plan view of the sensor chip explaining the distance Y and a simulation area S, according to the preferred embodiment.

A relation between the number of cracks and a position where the crack is provided is shown in FIG. 4A. As shown in FIG. 4B, the position of the crack is defined by Y, which is measured from an edge of the membrane 12. In FIG. 4A, the total number of cracks is 38, average value of the position of the crack is 1.65 $\mu$m, deviation 3$\sigma$, i.e., three sigma of standard deviation, is 3.37 $\mu$m, the maximum value of the position of the crack is 4.0 $\mu$m, the minimum value of the position of the crack is 0.0 $\mu$m, and each length A, B of edges of the membrane 12 is 1000 $\mu$m.

As shown in FIG. 4A, the crack is mainly arisen in a range between 0 $\mu$m, i.e., the edge of the membrane, and 3 $\mu$m. In a range between 0 $\mu$m and 4.5 $\mu$m, almost all of the cracks are arisen. According to this result, the width W of the stress relaxation area 16 is determined to 5 $\mu$m. This value, i.e., 5 $\mu$m, is one-two hundredth of the width B of the membrane 12. Here, the width B of the membrane 12 is 1000 $\mu$m. Thus, the above formula (2) is derived.

Figure 5:
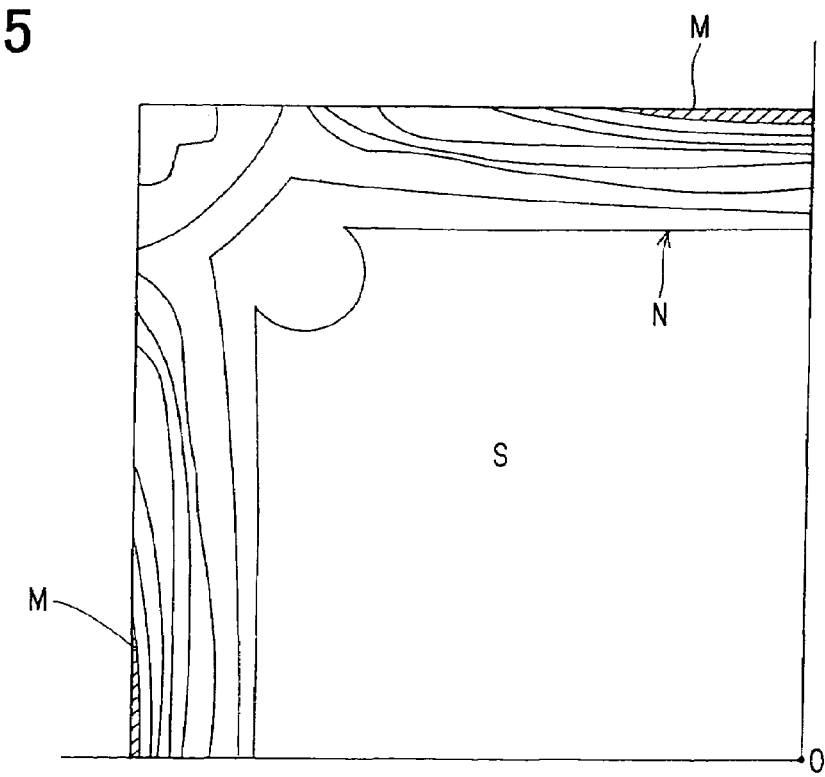
FIG. 5 is a partial plan view of a membrane in the simulation area S showing a contour of stress, according to the preferred embodiment.

On the other hand, the formula (1) is derived from a simulation performed by the inventors. The simulation is performed by a finite element method (i.e., FEM) so that an area where the stress is concentrated is confirmed. As shown in FIG. 4B, the stress is analyzed in a simulation area S, which is disposed on an upper left side of the membrane 12. The result of the simulation is shown in FIG. 5. In FIG. 5, a contour line of the stress is shown. Here, the stress along with the contour line is applied equivalently. In the middle of the edge of the rectangular shape of the membrane 12, a large stress area M is formed. The large stress area M is shown as a slanting line portion in FIG. 5. A small stress area N is disposed on an area, which is separated from the edge of the rectangular shape of the membrane 12. According to this result, the length L of the stress relaxation area 16 is determined to one-fifteenth of the width A of the membrane 12. Here, the width A of the membrane 12 is 1000 $\mu$m.

Thus, the stress relaxation area 16 is defined. Since the sensor 10 has the stress relaxation area 16, in which the stress is concentrated, the sensor 10 is limited to increase the stress so that the sensor 10 is limited to crack and to be broken.

In this embodiment, the stress relaxation area 16 is formed for protecting the sensor from cracking or being broken. The stress relaxation area 16 is easily formed without adding a new part or adding a new manufacturing process, since the stress relaxation area 16 can be formed with only changing a pattern of the thermopile 14. Therefore, the manufacturing process of the sensor 10 is not changed substantially so that the manufacturing cost of the sensor 10 is almost the same as that of the sensor 1.

Although the membrane 12 has a rectangular shape, other polygons such as pentagon and hexagon can be used as the shape of the membrane 12. Especially, in a case where the membrane 12 has a certain shape in which the stress concentration is easily arisen, a portion where the stress is concentrated is defined as the stress relaxation area 16, and the thermopile is not formed on the stress relaxation area 16. Thus, the sensor 10 is limited to increase stress so as to protect from cracking and being broken. Moreover, the degree of freedom in the design of the sensor 10 is increased, because the sensor 10 is protected from cracking or being broken, comparing a case where the thermopile 14 is formed on the membrane 12 uniformly so that the sensor 1 easily cracks and is broken.

Although the sensor 10 is the infrared light sensor, other sensors such as collector type temperature sensor and pressure sensor, which has a membrane for detecting physical quantity, can be used as the sensor 10.

Such changes and modifications are to be understood as being within the scope of the present invention as defined by the appended claims.

What is claimed is:

1. A sensor comprising:
a detector for detecting physical quantity, wherein the detector includes a thermopile for detecting an infrared light, the thermopile including a plurality of thermocouples with a pair of a hot contact portion and a cold contact potion, the hot contact portion of the thermopile being covered with an infrared absorption film;
a membrane; and
a stress relaxation area, in which a stress is expected to concentrate in a case of manufacturing process of the sensor or a case of operating the sensor,
wherein the detector is disposed on the membrane except for the stress relaxation area, the hot contact portion being disposed on the membrane, and the cold contact portion being disposed outside of the membrane, and
wherein each thermocouple does not overlap in a vertical direction of the membrane.

2. The sensor according to claim 1,
wherein the membrane has a rectangular shape.

3. The sensor according to claim 2,
wherein the rectangular shape of the membrane has a width and a length,
wherein the stress relaxation area has a rectangular shape having a width and a length, the width being one-two hundredth of the width of the membrane, and the length being one-fifteenth of the length of the membrane, and
wherein the stress relaxation area is disposed in a middle of an edge of the rectangular shape, and disposed inside from the edge of the rectangular shape.

4. The sensor according to claim 2, wherein
the rectangular shape of the membrane has four sides, and
the stress relaxation area is disposed on each side of the rectangular shape.

5. The sensor according to claim 4, wherein
the stress relaxation area is disposed on a center of each side of the rectangular shape of the membrane, and
the stress relaxation area has a rectangular shape, one side of which is parallel to one side of the rectangular shape of the membrane.

6. The sensor according to claim 5, wherein
the one side of the stress relaxation area is disposed on the one side of the rectangular shape of the membrane, and
the stress relaxation area is disposed inside of the rectangular shape of the membrane.

7. The sensor according to claim 1,
wherein the stress relaxation area is disposed in a range between 0 $\mu$m and 5 $\mu$m measured from an edge of the membrane.

8. The sensor according to claim 1,
wherein the detector includes a collector for detecting temperature or pressure.

9. The sensor according to claim 1,
wherein the membrane is composed of a thin film disposed on a semiconductor substrate, and
wherein the thermopile is disposed on the thin film.

10. The sensor according to claim 9,
wherein the semiconductor substrate has a rectangular opening disposed opposite to the thin film so that the membrane has a rectangular shape,
wherein the hot contact portion is disposed on the thin film of the membrane so that the hot contact portion is disposed on the rectangular opening of the semiconductor substrate, and
wherein the cold contact portion is disposed on the thin film on the semiconductor substrate.

* * * * *